Dec. 4, 1934.  C. H. DESAUTELS  1,982,860
MANUFACTURE OF PNEUMATIC TIRE CASINGS
Filed Dec. 24, 1931   2 Sheets-Sheet 1
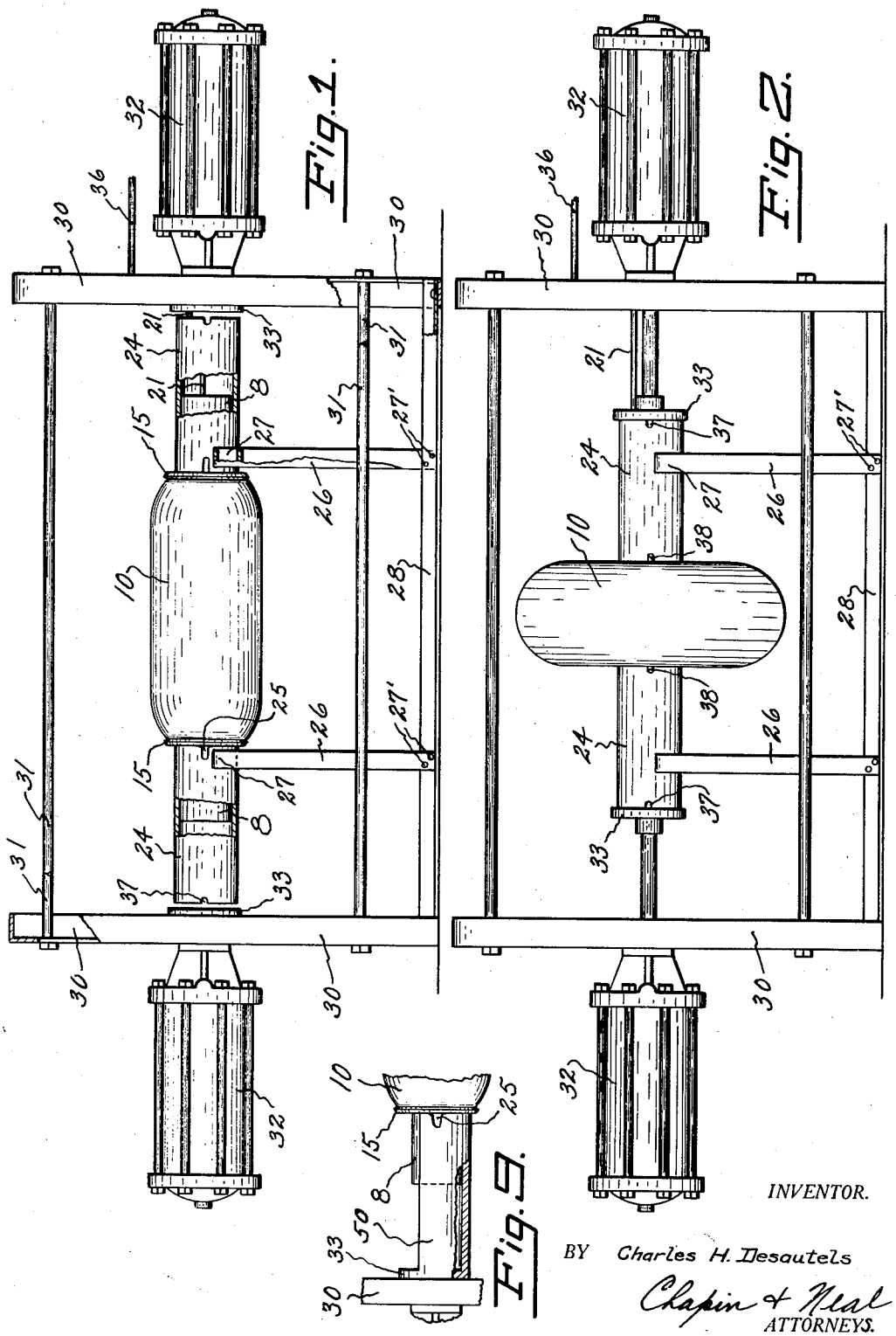
INVENTOR.
BY Charles H. Desautels
Chapin & Neal
ATTORNEYS.

Dec. 4, 1934.  C. H. DESAUTELS  1,982,860
MANUFACTURE OF PNEUMATIC TIRE CASINGS
Filed Dec. 24, 1931  2 Sheets-Sheet 2
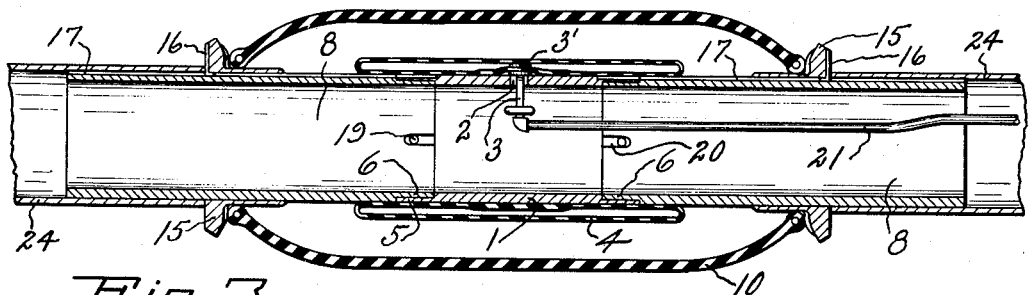
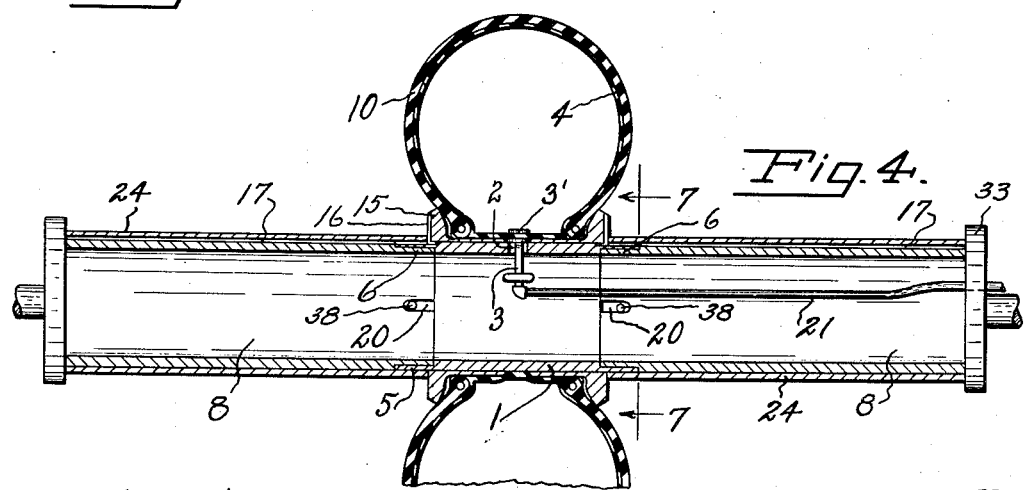
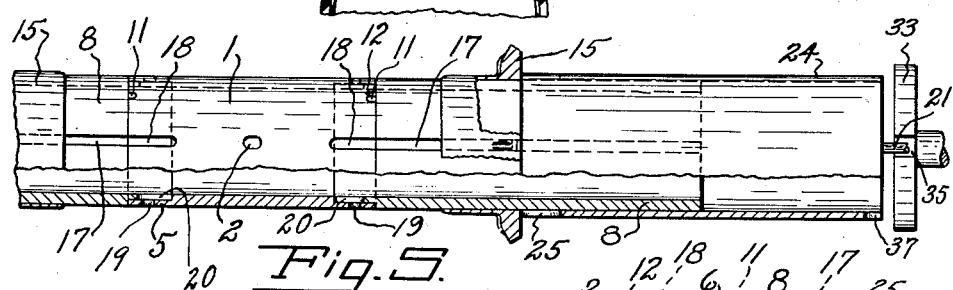
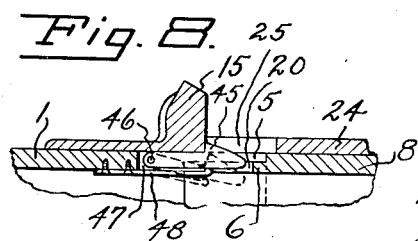
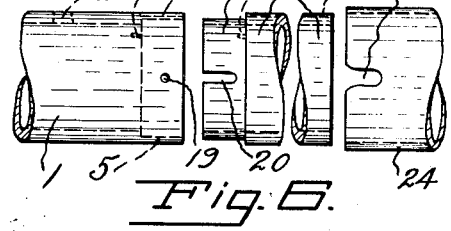
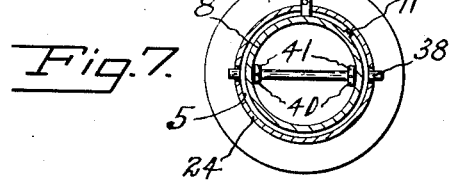
INVENTOR.
BY Charles H. Desautels
Chapin + Neal
ATTORNEYS.

Patented Dec. 4, 1934

1,982,860

UNITED STATES PATENT OFFICE 1,982,860

MANUFACTURE OF PNEUMATIC TIRE CASINGS

Charles H. Desautels, Springfield, Mass., assignor, by mesne assignments, to The Fisk Rubber Corporation, a corporation of Delaware Application December 24, 1931, Serial No. 583,001

3 Claims. (Cl. 154—14)

This invention relates to the manufacture of pneumatic tire casings of relatively large cross-section and small bead diameter and more particularly to a method of, and machine for, expanding such tires from the flat or semi-flat form in which they are built, to tire form. Tires of this character, usually described as air wheels, are of such small bead diameter that they are mounted directly on a hub without the interposition of a wheel structure between the rim on which the tire is mounted and the hub. This lack of wheel structure is made up for by an increase in the cross-sectional diameter of the tire itself. When such tires are built flat or semi-flat difficulties are encountered when it is attempted to shape them to tire form by conventional methods, and further difficulty is encountered in inserting the fluid pressure bag into the tire preliminary to its vulcanization. Moreover, due to the large cross-section and flexible construction of these tires it is difficult to properly position them in the molds and to apply the bead rings which shape the bead portions of the tire.

It is the principal object of this invention to provide a method and machine by which these difficulties may be overcome and to facilitate the shaping, bagging, and rimming of the tires and their insertion in the mold. Further and more specific objects will be apparent from the following specification and claims.

I have found that if the tire, fluid pressure bag and bead rings are first assembled, and the bag inflated simultaneously with the shaping of the tire, the assembly may be handled and inserted in the mold as a unit with a substantial saving in labor, and that a superior and more uniform product is obtained.

In general my method comprises positioning the bag in deflated position on a short cylindrical sleeve of substantially the same diameter as the tire beads, telescoping the generally cylindrical unshaped tire over the bag and sleeve, aligning the bead rings with the beads of the tire and shaping the tire by simultaneously inflating the bag and moving the rings toward each other until they telescope over the short sleeve, to which they are then clamped. The tire is thus held in shape by the rings in cooperation with the pressure within the tire, which pressure is maintained at or slightly below the pressure employed during the shaping operation, during the time which elapses between its removal from the shaper and its insertion in the mold. My invention will be clear from the illustrative embodiment shown in the accompanying drawings and the following description thereof.

In the drawings,

Fig. 1 is a side elevation of a machine according to my invention, showing the parts in position for the shaping operation;

Fig. 2 is a similar view showing the tire shaped;

Fig. 3 is a sectional view on a larger scale showing the unshaped tire positioned on the support;

Fig. 4 is a view similar to that of Fig. 2, on a larger scale, but showing the tire and the supporting mechanism in section;

Fig. 5 is a view, partly in section, of the supporting mechanism assembled;

Fig. 6 is a view of the structure shown in Fig. 5 looking from the bottom of the latter figure and with the parts axially separated;

Fig. 7 is a sectional view on line 7—7 of Fig. 4;

Fig. 8 is a detail view showing a modified form of locking means; and

Fig. 9 is a detail view of a modified form of the compressing mechanism.

Referring to the drawings, 1 designates the tire and bead ring supporting member which, as best shown in Figs. 4, 5 and 6, is apertured as at 2 to receive the separable stem 3 of an air or other fluid pressure bag 4, stem 3 being threaded into a base 3' secured to the bag. The opposite ends of the member 1 are interiorly enlarged as at 5 to receive the flanges 6 of cylindrical extension sleeves or sections 8, the sleeves when assembled providing with central member 1 a sectional cylindrical support of uniform diameter and of a length to accommodate the unshaped casing 10, as shown in Figs. 1 and 3. The member 1 is kept in proper alignment with the extension sleeves 8 by arcuate projections 11 formed on the extension sleeves which fit within recesses 12 formed in the central member. Opposed bead rings 15 are slidably mounted on the supporting cylinder formed by the assembled sections and in order that the rings may be positioned to properly mold the bead configuration in desired relation on the beads each ring is provided with a key 16 fitting in key ways 17 formed in the extension sleeves 8 and aligned key ways 18 formed in the member 1. Member 1 is provided inwardly of each end with diametrically opposite holes 19 adapted to receive bead ring locking pins as later described, and the flanges 6 of the extension sleeves are provided with slots 20 which register with the holes 19 when the sections are assembled, as shown in Figs. 3, 4 and 5.

In use the deflated fluid pressure bag 4 is positioned centrally on member 1 and stem 3 is threaded into the airbag through the aperture 2 (Fig. 3). A flexible air hose 21 is connected to the stem 3 and the sleeves 8 assembled to the ends of member 1. The casing 10 is telescoped onto the thus assembled cylinder and the bead rings 15 slipped over the ends of the cylinder and into engagement with the beads of the casing. Compressor sleeves 24 are now telescoped over the free end of the sleeves 8 into engagement with the bead rings 15. Sleeves 24 are somewhat longer than the sleeves 8 and are provided on the ends adjacent the bead rings with flared slots 25 adapted to register, as later described, with the holes 19 and slots 20.

The completed assembly as above described and shown in Fig. 3 is now placed on spaced supports 26 conveniently formed of metal strips bent at 27 to form arcuate seats for the cylinder and having their ends bolted or otherwise secured as at 27' to opposite sides of a base member 28. Secured to the ends of base 28 are four uprights 30, suitably braced by rods 31, which support aligned air cylinders 32, the pistons of which carry heads 33 positioned as shown in Fig. 1 to engage the outer ends of the compressor sleeves 24. Suitable valves (not shown) are provided to actuate the air cylinders which constitute a press between which the tire carrying assembly is positioned.

The free end of flexible connections 21 is brought outwardly of sleeve 24 through a recess 35 formed in one of the heads 33, as shown in Fig. 5, and is connected to a pipe 36 leading to a source of fluid pressure not shown.

Simultaneously with the admission of fluid pressure to the bag the cylinders 32 are operated to drive the compressor sleeves 24 toward each other, moving the bead rings and the beads of the casing together to the position shown in Figs. 2 and 4, thus shaping the tire, in cooperation with the pressure entering the bag, and at the same time positioning the bead rings in the relation to the tire which they are to occupy in the vulcanizing mold. Slots 37 formed in the outer ends of sleeves 24 are preferably provided to reveal the outer ends of sleeves 8 when the sleeves 24 have advanced sufficiently to properly shape the tire casing.

As shown in Fig. 4, the bead rings when in final position at the end of the shaping operation are positioned on member 1 just inwardly of the holes 19 and the rings are locked in this position by locking pins 38 which are inserted through the holes 19.

As shown in Fig. 2, the pins are initially positioned through only one of the aligned holes 19, after which the sections of the supporting cylinder are disassembled. The pressure within the bag is then relieved to permit adjustment of the bag with respect to the casing. During the time that the pressure is relieved collars 40 are threaded on the pins 38, which are now accessible by removal of sleeve 8, and the pins thrust through the opposite hole 19, the collars being then set in place as shown in Fig. 7 by means of set screws 41 to thus hold the pins in place. The bag is now reinflated and the tire casing is ready for placing in the vulcanizing mold.

In Fig. 8 is shown a modified locking means in the form of pawls 45 pivoted at 46 in slots 47 formed in the edges of member 1 in place of holes 19 and normally held in outward position, as shown in the figure by a leaf spring 48 secured to member 1. As the bead rings 15 are advanced by the compressor sleeves 24 the pawls 45 are depressed, as shown in dotted lines, into the slots 20 of sections 8 and after the rings have passed return to full line position within slots 25 of the compressor sleeves, to lock the rings in place.

In Fig. 9 is shown a modification in which the compressor sleeves 24 are replaced by semi-cylindrical compressor members 50 formed integral with, or otherwise secured to, the piston heads 33. The members 50 are positioned with their open sides upwardly so that the assembly of member 1, sleeves 8 and tire and bead rings 15 may be seated in members 50 as shown with the bead rings in position to be engaged and moved toward each other by the members 50 upon actuation of the pressure cylinders. In this arrangement supports 26 are omitted since the assembly is supported by members 50.

Having thus described my invention, I claim:

1. In that method of preparing a pneumatic tire casing, constructed in a generally cylindrical form with its beads abnormally spaced, for insertion in a vulcanizing mold, wherein the casing is brought to an approximation of finished tire shape by positioning a fluid pressure bag within the casing, mechanically moving the beads of the casing toward each other and simultaneously applying fluid pressure to the interior of the casing by inflation of the bag, the steps of at least partially relieving the fluid pressure within the bag after the beads have been moved to final position, to permit self-adjustment of the bag and casing with respect to each other, but without disarranging the assembly, and then reinflating the bag.

2. Means for preparing a pneumatic tire casing, constructed in a generally cylindrical form with its beads abnormally spaced, for insertion in a vulcanizing mold, which comprises a central cylindrical member adapted to support an air bag, cylindrical extension members having portions slidably engaging within the central member and adapted to support the unshaped casing and the bead rings of the mold, and cylindrical presser members telescoped over the ends of the extension members and engageable with the bead rings, the degree of interfitting of the central, extension and presser members being sufficient to render the assembly self-supporting when in a horizontal position, the free ends of the presser members being adapted to be engaged by movable press heads to force the cylindrical presser members against the bead rings and move the latter into tire shaping and molding position, the respective lengths of the extension members and the cylindrical presser members being such that the outer ends of the extension members act as a stop for the movable press heads when the bead rings reach tire shaping and molding position.

3. Means for preparing a pneumatic tire casing, constructed in a generally cylindrical form with its beads abnormally spaced, for insertion in a vulcanizing mold which comprises a frame, opposed press heads mounted in the ends of the frame for horizontal movement toward each other, a central cylindrical member adapted to support an air bag, cylindrical extension members having portions slidably engaging within the central member and adapted to support the unshaped casing and the bead rings of the mold, cylindrical presser members telescoped over the ends of the extension members with their inner ends in engagement with the bead rings, the degree of interfitting of the central, extension and presser members being sufficient to render the assembly self-supporting, and spaced saddle members positioned within said frame to support the assembly between and in line with said movable press heads so that upon inward movement of the press heads the free ends of the cylindrical presser members will be engaged thereby to force the bead rings into tire shaping and molding position, the respective lengths of the extension members and the cylindrical presser members being such that the outer ends of the extension members act as a stop for the press heads when the bead rings reach tire shaping and molding position.

CHARLES H. DESAUTELS.